US007742056B2

(12) United States Patent
Miyazawa

(10) Patent No.: US 7,742,056 B2
(45) Date of Patent: Jun. 22, 2010

(54) IMAGE DISPLAY SYSTEM

(75) Inventor: Yasunaga Miyazawa, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 490 days.

(21) Appl. No.: 11/769,244

(22) Filed: Jun. 27, 2007

(65) Prior Publication Data
US 2008/0079742 A1 Apr. 3, 2008

(30) Foreign Application Priority Data

Jul. 6, 2006 (JP) .............................. 2006-186376
May 17, 2007 (JP) .............................. 2007-131314

(51) Int. Cl.
G06F 3/038 (2006.01)
G09G 5/00 (2006.01)
G06K 9/40 (2006.01)
G03B 21/14 (2006.01)
H04N 1/40 (2006.01)
H04N 1/387 (2006.01)
H04N 1/46 (2006.01)

(52) U.S. Cl. ....................... 345/581; 345/618; 345/204; 382/254; 382/274; 353/69; 358/448; 358/452; 358/537

(58) Field of Classification Search ................. 345/428, 345/581, 617–618, 619, 204, 690; 348/744, 348/807; 358/447–448, 519, 537–539, 452–453; 382/254, 274, 276; 353/69, 30; 715/273, 715/275

See application file for complete search history.

(56) References Cited

U.S. PATENT DOCUMENTS

| 6,661,425 | B1 * | 12/2003 | Hiroaki | ..................... | 345/629 |
| 2009/0073261 | A1 * | 3/2009 | Takemura et al. | ............. | 348/71 |
| 2009/0256969 | A1 * | 10/2009 | Takeuchi | ..................... | 348/687 |
| 2009/0303349 | A1 * | 12/2009 | Kuwata | ................... | 348/231.3 |

FOREIGN PATENT DOCUMENTS

| JP | 2004-069996 | 3/2004 |
| JP | 2004-088194 | 3/2004 |

* cited by examiner

Primary Examiner—Sajous Wesner
(74) Attorney, Agent, or Firm—Oliff & Berridge, PLC

(57) ABSTRACT

An image display system includes: an information processing apparatus that performs predetermined correction processing for image data to be displayed; and an image display apparatus that displays an image on the basis of the image data correction-processed in the information processing apparatus. The information processing apparatus includes a first image correction operation processing section that executes, for the image data, correction processing set on the basis of characteristics of the image data of a plurality of correction processing to be performed for the image data. The image display apparatus includes a second image correction operation processing section that executes, for the image data correction-processed in the information processing apparatus, correction processing other than correction processing executed in the information processing apparatus of the plurality of correction processing to be performed for the image data.

13 Claims, 5 Drawing Sheets

IMAGE DISPLAY SYSTEM

BACKGROUND

1. Technical Field

The present invention relates to an image display system, an information processing apparatus used in the image display system, an image display apparatus used in the image display system, an image correction program used in the information processing apparatus, and an image correction program used in the image display apparatus.

2. Related Art

There is known an image display system including a personal computer (hereinafter, referred to as 'PC'), which serves as an information processing apparatus that supplies image data to be displayed, and a projector that projects an image image-processed by the PC on a screen.

In such image display system, various kinds of correction processing are performed for image data transmitted from the PC to the projector using an image processing unit in the projector. In addition, the various kinds of correction processing include resolution conversion, edge enhancement, black and white expansion, shape correction, color conversion, gamma correction, VT-gamma correction, ghost correction, crosstalk correction, and color unevenness correction, for example.

For this reason, the image processing unit in the projector becomes large, which is one of the causes of cost increase. Moreover, in order to realize an image with higher quality, highly precise processing is needed. Accordingly, it is necessary to mount a high-performance image processing unit, which further increases the cost.

In order to cope with such a problem, there has been proposed an image display system in which the various kinds of correction processing described above are performed in a PC and image data after correction processing is transmitted to a projector through a signal transmission unit, such as a USB cable (for example, refer to JP-A-2004-69996 and JP-A-2004-88194).

In the image display system described above, most of the image processing is performed in the PC, and accordingly, it may be possible to make the configuration of a projector very simple. In addition, since the PC originally has a graphic processing function, such as a GPU (graphic processor unit), highly precise image correction may be performed without adding a new function in the PC.

Each of the image display systems disclosed in JP-A-2004-69996 and JP-A-2004-88194 has the configuration in which a PC and a projector are connected to each other through a USB cable. For this reason, it is difficult to transmit a high-definition image based on, for example, Hi-Vision standard with a transmission rate of 60 frames/sec. Therefore, it is general that a PC performs compression processing for image data after correction processing and then transmits the compressed image data to a projector. Particularly in the case when the image data is a motion picture, it is common to transmit differential data of a portion that changes for every frame.

In the case when all kinds of correction processing are performed in the PC, image data is corrected with high definition; however, since the correction processing is performed on most pixels of the image data, variations in most pixels occur in previous-frame image data and present-frame image data even if differential data between previous image data and present image data is applied.

Thus, since a data compression rate becomes low even if the differential data is applied, the amount of data transmitted from the PC to the projector significantly increases. As a result, a problem occurs in which the deadline of data transmission from the PC to the projector is not met and a frame rate for image display in the projector is not appropriately maintained.

In this case, for example, it may be considered to suppress the degree of image correction low such that the differential data does not become too large. However, this is not a proper method because the quality of a display image deteriorates. Alternatively, the differential data may be made small by making rough differential data such that a small change between image frames is not detected when obtaining the differential data. However, since present image data reproduced by the projector is deficient in information, the quality of a display image deteriorates. Accordingly, this is not a proper method either.

SUMMARY

An advantage of some aspects of the invention is that it provides an image display system capable of performing appropriate correction processing according to the characteristics of image data to be displayed, appropriately maintaining the frame rate for image display in an image display apparatus, and realizing high-quality image display by dynamically changing correction processing to be executed in a PC and a projector according to the characteristics of image data, an information processing apparatus used in the image display system, an image display apparatus used in the image display system, an image correction program used in the information processing apparatus, and an image correction program used in the image display apparatus.

According to a first aspect of the invention, an image display system includes: an information processing apparatus that performs predetermined correction processing for image data to be displayed; and an image display apparatus that displays an image on the basis of the image data correction-processed in the information processing apparatus. The information processing apparatus includes a first image correction operation processing section that executes, for the image data, correction processing set on the basis of characteristics of the image data of a plurality of correction processing to be performed for the image data. The image display apparatus includes a second image correction operation processing section that executes, for the image data correction-processed in the information processing apparatus, correction processing other than correction processing executed in the information processing apparatus of the plurality of correction processing to be performed for the image data.

In the image display system according to the first aspect of the invention, correction processing to be performed in the information processing apparatus is set on the basis of the characteristics of image data and the set correction processing is executed in the information processing apparatus. On the other hand, in the image display apparatus, correction processing other than correction processing executed in the information processing apparatus is executed. As described above, correction processing to be executed in the information processing apparatus and correction processing to be executed in the image display apparatus are dynamically changed according to the characteristics of image data. Thus, it is possible to perform correction processing corresponding to the characteristics of image data. In addition, even when correction processing is performed for image data whose compression rate is low, such as image data corresponding to a motion picture, it is possible to appropriately maintain the frame rate for image display in the image display apparatus. Accordingly, since an image can be displayed at the appropriate frame rate in the image display apparatus, high-quality image display becomes possible.

In the image display system described above, preferably, the information processing apparatus and the image display apparatus are connected to each other through a signal transmission unit.

The signal transmission unit used in the image display system according to the aspect of the invention is assumed to be a signal transmission unit, such as a USB cable, having significant limitation in the transmission rate. Even in the case when the information processing apparatus and the image display apparatus are connected to each other using the signal transmission unit, it is possible to display an image with an appropriate frame rate in the image display apparatus by using the configuration described above. Thus, the high-quality image display becomes possible.

Furthermore, in the image display system described above, preferably, the information processing apparatus includes an image data characteristic determining section that determines characteristics of the image data, and the first image correction operation processing section sets correction processing, which is to be executed in the information processing apparatus, of the plurality of correction processing to be performed for the image data on the basis of the characteristics of the image data determined by the image data characteristic determining section.

According to the configuration described above, it is possible to determine the characteristics of image data using the image data characteristic determining section, and it is possible to appropriately set correction processing to be executed in the information processing apparatus on the basis of the determined characteristics of the image data.

Furthermore, in the image display system described above, preferably, the image data characteristic determining section dynamically determines the characteristics of the image data according to the image data, and the first image correction operation processing section dynamically sets correction processing, which is to be performed by the information processing apparatus, on the basis of a result of the determination made by the image data characteristic determining section.

This means that, for example, in the case when a plurality of image data to be displayed exists, the image data characteristic determining section determines the characteristics of corresponding image data for each of the plurality of image data and the first image correction operation processing section sets correction processing, which is to be performed in the information processing apparatus, for each of the image data on the basis of a result of the determination made by the image data characteristic determining section. Thus, it is possible to appropriately set correction processing, which is to be performed by the information processing apparatus, according to image data to be displayed. In addition, in the case when image data to be displayed is image data, such as a movie, correction processing to be performed by the information processing apparatus may be set according to characteristics of image data corresponding to each scene.

Furthermore, in the image display system described above, preferably, the image data characteristic determining section performs at least one of determination on whether or not the image data is first characteristic image data having a characteristic in which display quality in the image display apparatus weighs, determination on whether or not the image data is second characteristic image data having a characteristic in which a rate of transmission to the image display apparatus weighs, and determination on whether or not the image data is third characteristic image data having a characteristic of temporal change between frames equal to or larger than a predetermined value.

Thus, the characteristics of image data can be appropriately determined. In this case, as an example of the first characteristic image data having a characteristic in which display quality in the image display apparatus weighs', there is image data corresponding to a still image, for example. In addition, as examples of the 'second characteristic image data having a characteristic in which a rate of transmission to the image display apparatus weighs' and the 'third characteristic image data having a characteristic of temporal change between frames equal to or larger than a predetermined value', there is image data corresponding to a motion picture, for example.

However, even if image data is a motion picture, image data corresponding to an image in which there is little motion on the whole (for example, an image obtained by shooting the scenery, in which there is little motion on the whole, while moving a camera left and right in order to acquire a panoramic effect) or an image in which there is a motion in part (for example, an image in which a flow of water exists in a part of the scenery in which there is little motion on the whole) may be preferably determined as the first characteristic image data.

As described above, by appropriately setting correction processing to be performed in the information processing apparatus and correction processing to be performed in the image display apparatus according to the characteristics of image data, it becomes possible to perform correction processing corresponding to the characteristics of image data. In addition, even when correction processing is performed for image data whose compression rate is low, such as image data corresponding to a motion picture, it is possible to appropriately maintain the frame rate for image display in the image display apparatus. Accordingly, since an image can be displayed at the appropriate frame rate in the image display apparatus, high-quality image display becomes possible.

Furthermore, in the image display system described above, preferably, assuming that the plurality of correction processing to be performed for the image data is divided into a first correction processing group, which is a group of correction processing performed in a first half in an order of correction processing, and a second correction processing group, which is a group of correction processing performed in a second half in the order of correction processing, the first image correction operation processing section executes correction processing belonging to the first correction processing group and correction processing belonging to the second correction processing group in a case when the image data is determined to be the first characteristic image data and executes the correction processing belonging to the first correction processing group in at least one of cases when the image data is determined to be the second characteristic image data and the image data is determined to be the third characteristic image data.

In this case, for example, assuming that correction processing corresponding to image data is performed in the order of resolution conversion, edge enhancement, black and white expansion, shape correction, color conversion, gamma correction, VT-gamma correction, ghost correction, crosstalk correction, and color unevenness correction, group division is performed such that the resolution conversion, the edge enhancement, the black and white expansion, the shape correction, the color conversion, the gamma correction, and the VT-gamma correction belong to the first correction processing group, which is a group of correction processing performed in the first half, and the ghost correction, the crosstalk correction, and the color unevenness correction belong to the second correction processing group, which is a group of correction processing performed in the second half.

In addition, the first image correction operation processing section of the information processing apparatus executes the correction processing belonging to the first correction processing group and the correction processing belonging to the second correction processing group in the case when the image data is determined to be the first characteristic image data. In addition, the first image correction operation processing section of the information processing apparatus executes the correction processing belonging to the first correction processing group in at least one of the cases when the image data is determined to be the second characteristic image data and the image data is determined to be the third characteristic image data. Thus, it becomes possible to perform correction processing corresponding to image data by setting correction processing, which is to be performed in the information processing apparatus, according to the characteristics of image data.

Moreover, the correction processing belonging to the first correction processing group is mainly performed in the unit of a pixel in image data. Accordingly, in the correction processing in the information processing apparatus, predetermined conversion is performed on data corresponding to each pixel. For this reason, when compressing image data after correction processing and transmitting the compressed image data, the compression rate does not significantly change in both a case of compressing image data at a stage of an image before the correction processing and a case of compressing the image data at a stage of an image after the correction processing.

Accordingly, even in a case when image data, for which correction processing has been performed in the information processing apparatus, is transmitted to the image display apparatus through a signal transmission unit, such as a USB cable, having significant limitation in the transmission rate, it is possible to display an image with a proper frame rate in the image display apparatus. Thus, even when the correction processing belonging to the first correction processing group is performed for image data whose compression rate is low, such as image data corresponding to a motion picture, it is possible to appropriately maintain the frame rate for image display in the image display apparatus. As a result, since an image can be displayed at the appropriate frame rate in the image display apparatus, the high-quality image display becomes possible.

Moreover, in the case of an image, such as a still picture, in which the display quality weighs, both the correction processing belonging to the first correction processing group and the correction processing belonging to the second correction processing group are executed in the information processing apparatus. As a result, since highly precise correction processing can be performed, it is possible to improve the quality of a display image in the image display apparatus.

In addition, the correction processing belonging to the first correction processing group and the correction processing belonging to the second correction processing group may be selectively executed as necessary.

Furthermore, in the image display system described above, preferably, the determination on whether or not the image data is the first characteristic image data is performed on the basis of characteristic indication data indicating that the image data is the first characteristic image data.

Thus, by adding characteristic indication data, which indicates that image data is the first characteristic image data, in the image data as metadata, for example, the image data characteristic determining section can easily and appropriately determine that the image data is an image having the first characteristic image data.

In particular, since the determination on whether or not image data is the first characteristic image data (image data having a characteristic in which the display quality in the image display apparatus weighs) needs to be made on the basis of user's opinion in many cases, it is difficult to automatically determine whether or not the image data is the first characteristic image data. Therefore, the image data characteristic determining section can easily and appropriately determine that the image data is the first characteristic image data by adding metadata, which indicates that the image data is the first characteristic image data, in image data to be displayed.

Furthermore, in the image display system described above, preferably, the determination on whether or not the image data is the second characteristic image data is performed on the basis of at least one of a compression rate of the image data, resolution of the image data, a transmission rate of the image data, and characteristic indication data indicating that the image data is the second characteristic image data.

Thus, the determination on whether or not the image data is the second characteristic image data can be performed on the basis of at least one of the compression rate of the image data, resolution of the image data, the transmission rate of the image data, and metadata indicating that the image data is the second characteristic image data. That is, since the amount of data increases as the compression rate decreases, it is necessary to transmit the image data at a higher transmission rate. In addition, since the amount of data also increases even in the case when the resolution is high, it is also necessary to transmit the image data at a higher transmission rate. Moreover, even in the case when the image data is image data that needs to be transmitted at a higher transmission rate, it is necessary to transmit the image data at the higher transmission rate.

Therefore, the image data characteristic determining section can make a determination on whether or not the image data is the second characteristic image data (determination on whether or not the image data is image data having a characteristic in which a rate of transmission to the image display apparatus weighs) on the basis of at least one of the compression rate of the image data, the resolution of the image data, and the transmission rate of the image data. In addition, even by adding the characteristic indication data, which indicates that the image data is the second characteristic image data, in the image data as metadata, for example, the image data characteristic determining section can easily and appropriately determine that the image data is an image having the second characteristic image data on the basis of the metadata.

As described above, the image data characteristic determining section can determine whether or not the image data is the second characteristic image data on the basis of at least one of the compression rate of the image data, the resolution of the image data, the transmission rate of the image data, and characteristic indication data indicating that the image data is the second characteristic image data.

Furthermore, in the image display system described above, preferably, the determination on whether or not the image data is the third characteristic image data is performed on the basis of at least one of the size of a movement vector between frames in the image data and characteristic indication data indicating that the image data is the third characteristic image data.

Thus, the image data characteristic determining section can make the determination on whether or not the image data is the third characteristic image data (determination on whether or not the image data is image data having a characteristic of temporal change between frames equal to or larger than a predetermined value) on the basis of the size of a movement vector between frames in the image data. In addition, the size of the movement vector between frames in the image data may be determined by calculating the size of a movement vector of the image data in the unit of a block between frames of the image data and then using an integrated value or average value of movement vectors in the block unit, for example.

In addition, even by adding the characteristic indication data, which indicates that the image data is the third characteristic image data, in the image data as metadata, for example, the image data characteristic determining section can easily and appropriately determine that the image data is the third characteristic image data on the basis of the metadata.

As described above, the image data characteristic determining section can determine whether or not the image data is the third characteristic image data on the basis of at least one of the size of the movement vector between frames in the image data and the metadata indicating that the image data is the third characteristic image data.

Furthermore, in the image display system described above, preferably, the information processing apparatus has a function of notifying the image display apparatus of information that indicates correction processing, which is to be performed in the information processing apparatus, of the plurality of correction processing to be performed for the image data.

Thus, since the information processing apparatus has a function of notifying the image display apparatus of information that indicates correction processing to be performed in the information processing apparatus, the image display apparatus can see which kind of correction processing is performed in the information processing apparatus. Accordingly, the image display apparatus can appropriately set correction processing to be performed.

Furthermore, in the image display system described above, preferably, the information processing apparatus includes a transmission data generating section that generates transmission data to be transmitted to the image display apparatus by compressing the image data correction-processed by the first image correction operation processing section.

In this case, it is possible to generate compressed image data, which is obtained by compressing image data after correction processing in a predetermined compression method. Accordingly, even in a case when image data, for which correction processing has been performed in the information processing apparatus, is transmitted to the image display apparatus through a signal transmission unit, such as a USB cable, having significant limitation in the transmission rate, it is possible to appropriately transmit the image data to the image display apparatus without causing lack of image data in a motion picture or the like.

Furthermore, in the image display system described above, preferably, the information processing apparatus includes a correction parameter storage section that stores correction parameters required for correction processing executed in the first image correction operation processing section.

The image correction parameter storage section stores correction parameters required to perform various kinds of correction processing, such as the resolution conversion, the edge enhancement, the black and white expansion, the shape correction, the color conversion, the gamma correction, the VT-gamma correction, the ghost correction, the crosstalk correction, and the color unevenness correction. Thus, since the image display system includes the image correction parameter storage section that stores correction parameters required to perform various kinds of correction processing, the information processing apparatus can appropriately and easily acquire correction parameters required when executing correction processing corresponding to the characteristics of image data.

The various kinds of correction parameters may be acquired from the image display apparatus. Alternatively, the information processing apparatus may acquire the various kinds of correction parameters from a memory card, a CD-ROM, and the like, which store the various kinds of correction parameters, and then store the various kinds of correction parameters in the image correction parameter storage section. In addition, a user may add a new correction parameter or change the various kinds of correction parameters, for example, through a keyboard of a PC.

In addition, according to a second aspect of the invention, an information processing apparatus that performs predetermined correction processing for image data to be displayed in an image display apparatus includes an image correction operation processing section that executes, for the image data, correction processing set on the basis of characteristics of the image data of a plurality of correction processing to be performed for the image data.

By causing the information processing apparatus to have the configuration described above, the information processing apparatus can be made to be suitable for the image display system according to the first aspect of the invention. Furthermore, even for the information processing apparatus according to the second aspect of the invention, it is preferable to provide the characteristics of the image display system described above.

In addition, according to a third aspect of the invention, an image display apparatus that displays an image on the basis of image data correction-processed by an information processing apparatus that executes correction processing corresponding to characteristics of image data to be displayed includes an image correction operation processing section that executes, for the image data that is correction-processed, correction processing other than correction processing executed in the information processing apparatus of the plurality of correction processing to be performed for the image data.

By causing the image display apparatus to have the configuration described above, the image display apparatus can be made to be suitable for the image display system according to the first aspect of the invention.

In the image display apparatus according to the third aspect of the invention, preferably, the image correction operation processing section has a function of setting the correction processing other than the correction processing executed in the information processing apparatus from a plurality of correction processing, which is notified from the information processing apparatus and is to be performed for the image data, on the basis of information that indicates the correction processing executed in the information processing apparatus.

By causing the image correction operation processing section to have the function described above, the image correction operation processing section of the image display apparatus can appropriately set correction processing to be performed in the image display apparatus.

In addition, according to a fourth aspect of the invention, an image correction program used in an information processing apparatus having an image correction operation processing section that performs predetermined correction processing for image data to be displayed in an image display apparatus includes causing the image correction operation processing section to execute, for the image data, correction processing set on the basis of characteristics of the image data of a plurality of correction processing to be performed for the image data.

By installing the image correction program in the information processing apparatus, the image correction operation processing section of the information processing apparatus can set correction processing, which is to be performed in the information processing apparatus, according to the characteristics of the image data and execute the set correction processing. Furthermore, even for the image correction program used in the information processing apparatus according to the fourth aspect of the invention, it is preferable to provide the characteristics of the image display system described above.

In addition, according to a fifth aspect of the invention, an image correction program used in an image display apparatus having an image correction operation processing section that executes predetermined correction processing for image data correction-processed by an information processing apparatus that executes correction processing corresponding to characteristics of image data to be displayed includes causing the image correction operation processing section to execute, for the image data that is correction-processed, correction processing other than correction processing executed in the information processing apparatus of a plurality of correction processing to be performed for the image data.

By installing the image correction program in the image display apparatus, the image correction operation processing section of the image display apparatus can execute correction processing other than that executed in the information processing apparatus. Furthermore, even for the image correction program used in the image display apparatus according to the fifth aspect of the invention, it is preferable to provide the characteristics of the image display apparatus described above.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described.

Figure 1:
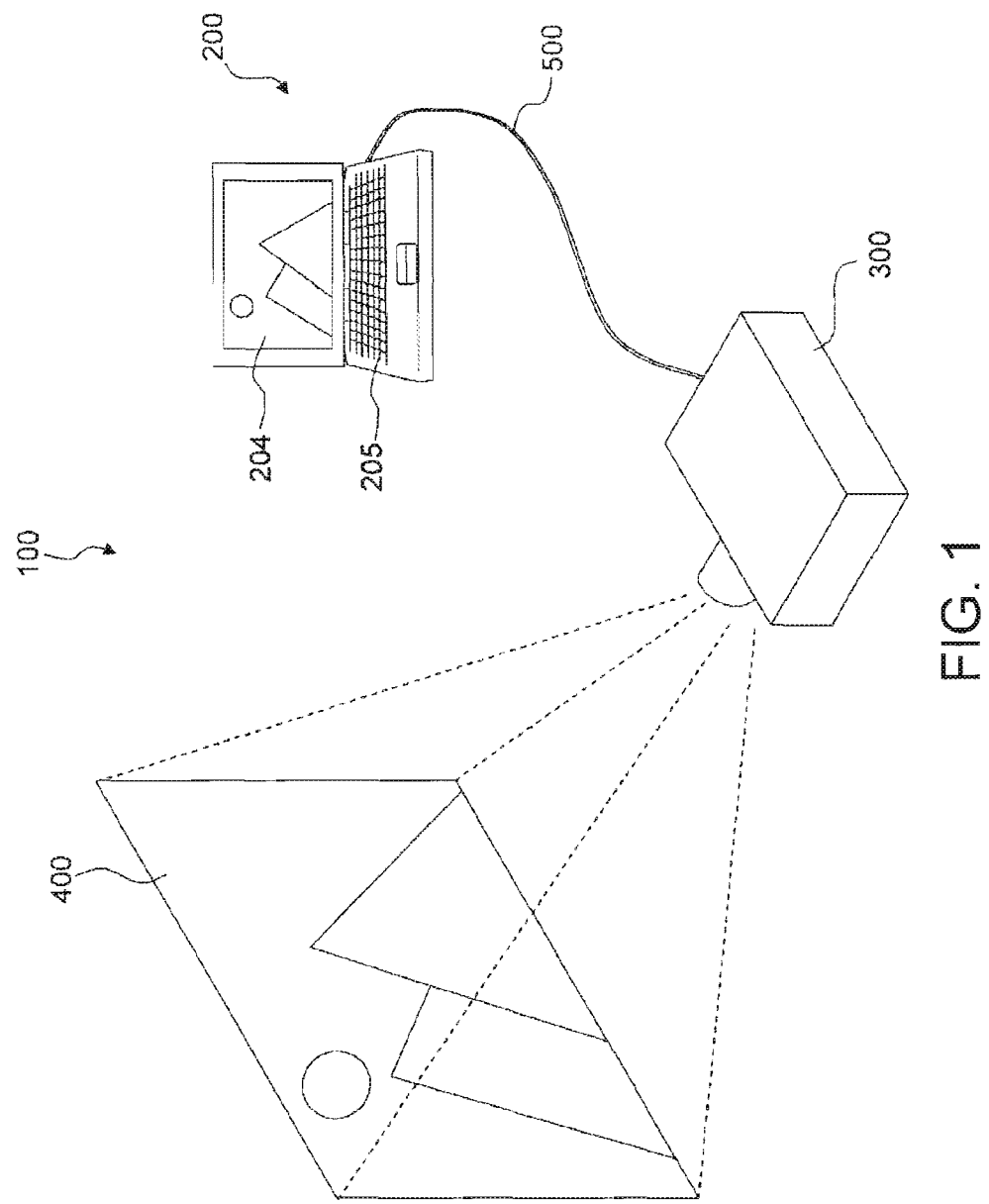
FIG. 1 is a view illustrating the configuration of external appearance of an image display system according to an embodiment of the invention.

FIG. 1 is a view illustrating the configuration of external appearance of an image display system according to an embodiment of the invention. As shown in FIG. 1, an image display system 100 according to the embodiment of the invention includes: a PC 200 serving as an information processing apparatus that outputs image data after performing image processing including various kinds of correction processing for image data to be displayed; a projector 300 serving as an image display apparatus that generates display image data on the basis of the image data from the PC 200 and projects an image corresponding to the generated display image data onto a screen 400; and a USB cable 500 serving as a signal transmission unit that connect the projector 300 and the PC 200 to each other.

Figure 2:
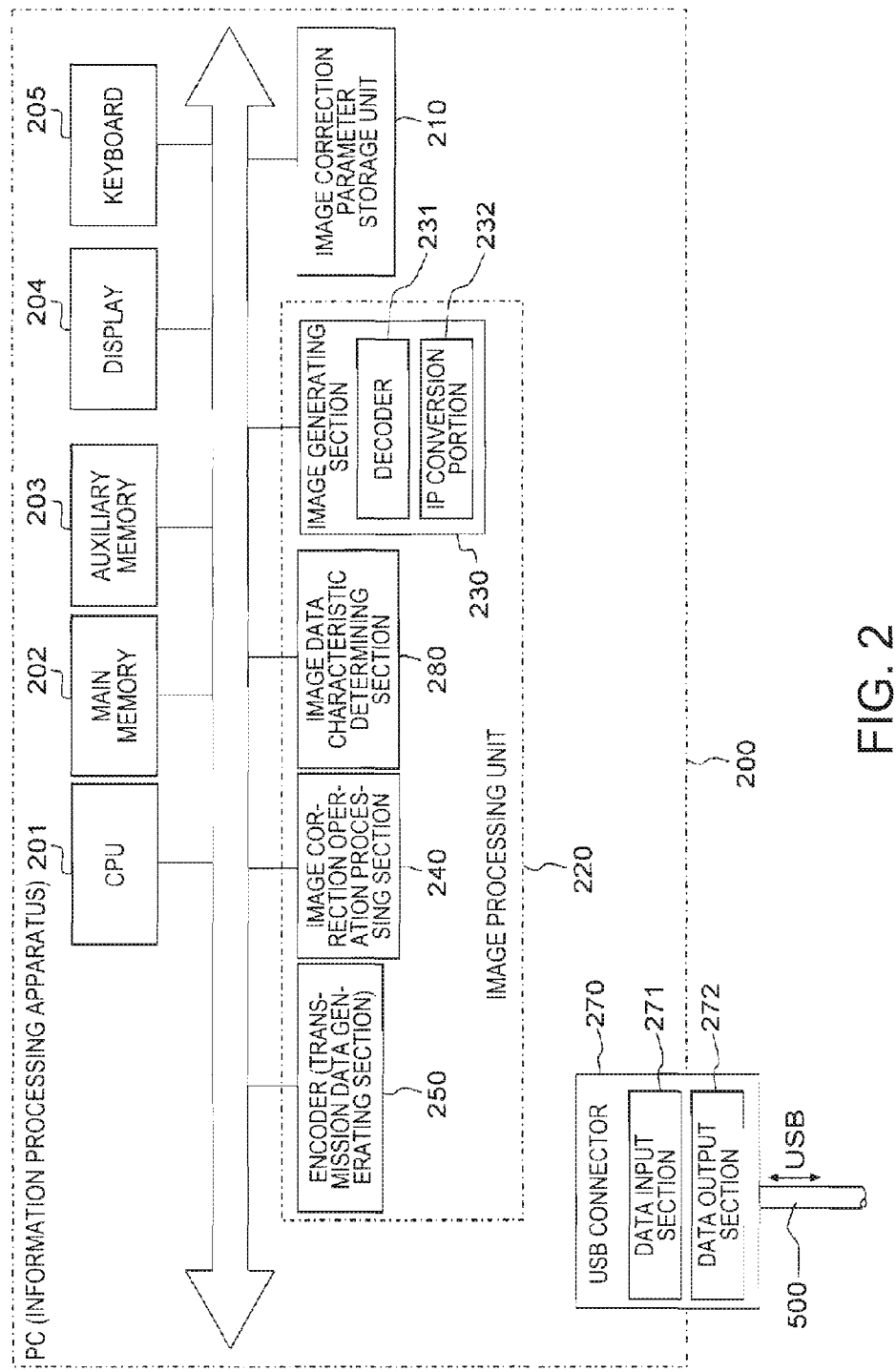
FIG. 2 is a functional block diagram illustrating a PC.

FIG. 2 is a functional block diagram illustrating the PC 200.

Figure 3:
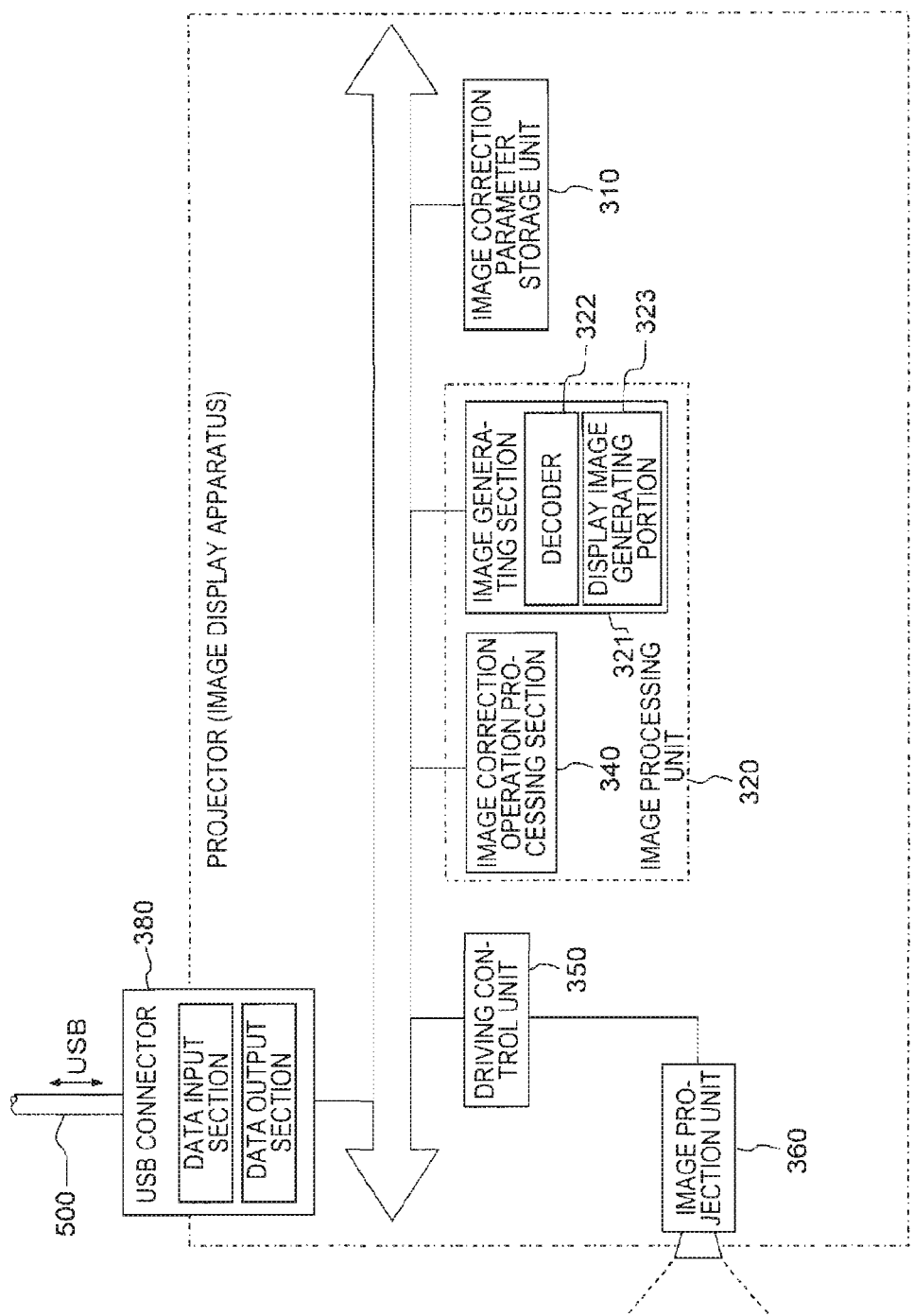
FIG. 3 is a functional block diagram illustrating a projector.

FIG. 3 is a functional block diagram illustrating the projector 300.

Figure 4:
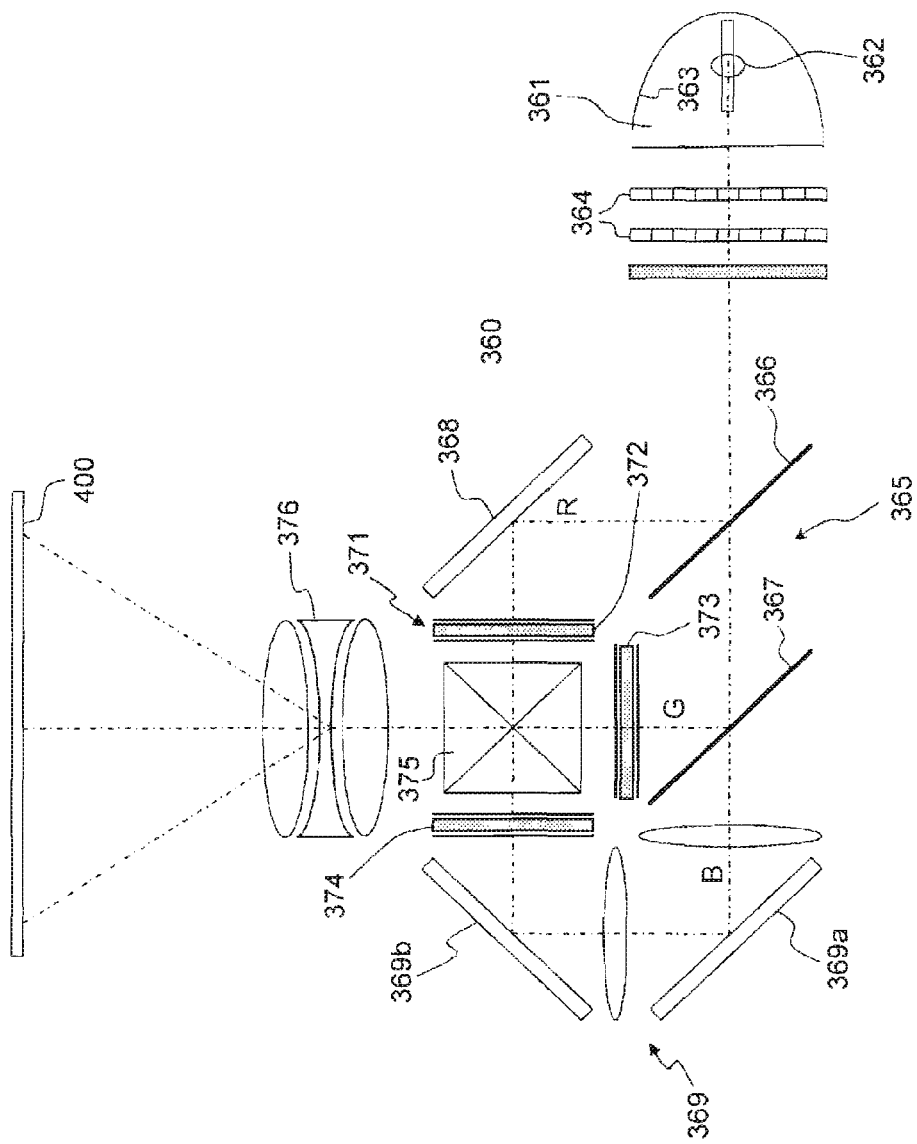
FIG. 4 is a view illustrating the configuration of an image projection unit in the projector.

FIG. 4 is a view illustrating the configuration of an image projection unit 360 in the projector 300.

Figure 5:
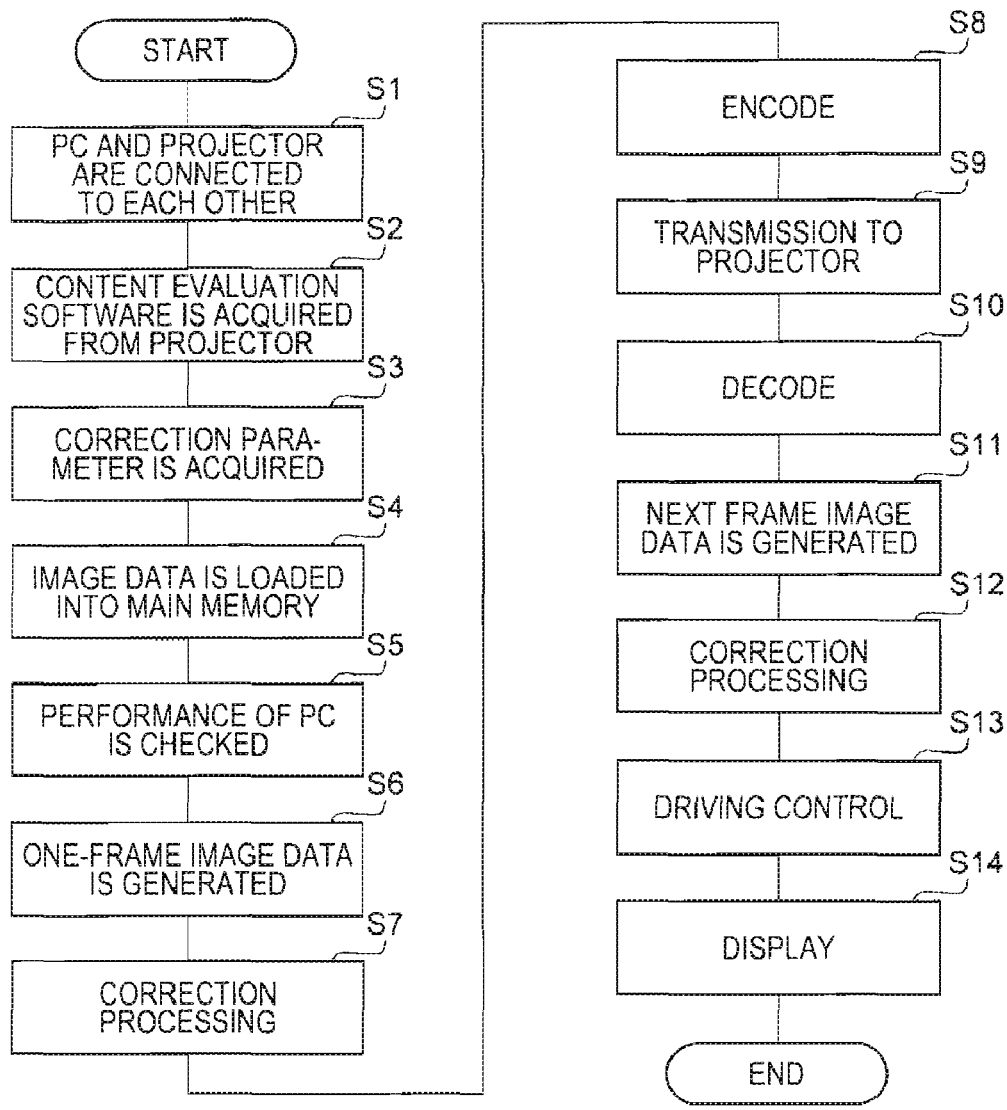
FIG. 5 is a flow chart explaining an operation of the image display system according to the embodiment of the invention.

FIG. 5 is a flow chart explaining an operation of an image display system according to the embodiment of the invention.

As shown in FIG. 2, the PC 200 is configured to include a CPU 201, a main memory 202, an auxiliary memory 203, a display 204, a keyboard 205, an image correction parameter storage unit 210, an image processing unit 220, and a USB connector 270.

The auxiliary memory 203 stores image data (hereinafter, simply referred to as 'image data') to be displayed. In addition, the image data may be stored in a DVD (digital versatile disc) or the like.

The image correction parameter storage unit 210 stores a correction parameter required for correction processing executed in an image correction operation processing section 240. An explanation on the correction parameter will be made later.

The image processing unit 220 includes an image generating section 230, the image correction operation processing section (first image correction operation processing section) 240, an encoder 250 serving as a transmission data generating section, and an image data characteristic determining section 280.

The image generating section 230 has a decoder 231 and an IP conversion portion 232 and performs decompression according to a data format of image data so as to generate the image data for every frame.

The image data characteristic determining section 280 determines the characteristics of image data on the basis of a contents evaluation program (referred to as 'contents evaluation software') acquired from the projector 300. In addition, the contents evaluation software acquired from the projector 300 may be stored in the auxiliary memory 203 or the like. In addition, the contents evaluation software may be acquired only once when the PC 200 and the projector 300 are connected to each other.

The image data characteristic determining section 280 performs at least one of determination on whether or not the image data is image data (referred to as 'first characteristic image data') having a characteristic in which the display quality in the projector 300 weighs, determination on whether or not the image data is image data (referred to as 'second characteristic image data') having a characteristic in which a rate of transmission to the projector 300 weighs, and determination on whether or not the image data is image data (referred to as 'third characteristic image data') having a characteristic of temporal change between frames equal to or larger than a predetermined value.

The image correction operation processing section 240 performs correction processing corresponding to the characteristics of image data using a correction parameter stored in the image correction parameter storage unit 210. In addition, the image correction operation processing section 240 has a function of generating information (referred to as 'correction processing indication information') indicating which correction processing of a plurality of correction processing to be performed for image data is performed in the PC 200. This correction processing indication information is notified to the projector 300 at predetermined timing (will be described later).

The encoder 250 compresses image data, for which correction processing is performed in the image correction operation processing section 240, and generates transmission data to be transmitted to the projector 300. Specifically, the encoder 250 has a function of comparing latest-frame image data with previous-frame image data in the image data corrected by the image correction operation processing section 240 and then extracting a changed portion as differential data. The differential data includes an amount of spatial variation and an amount of color tone variation.

The USB connector 270 includes a data input section 271 and a data output section 272 and performs input/output of data to/from the projector 300 through the USB cable 500.

Next, the configuration of the projector 300 will be described.

As shown in FIG. 3, the projector 300 includes an image correction parameter storage unit 310, an image processing unit 320, a driving control unit 350, an image projection unit 360, and a USB connector 380.

Correction parameters stored in the image correction parameter storage unit 310 are various kinds of parameters used to perform resolution conversion, edge enhancement, black and white expansion, shape correction, color conversion, gamma correction, VT-gamma correction, ghost correction, crosstalk correction, color unevenness correction, and the like. In addition, a ghost refers to a phenomenon where an image shifts and overlaps, and a crosstalk refers to the unevenness of an image occurring since pixels are driven by a leak current of a signal with respect to adjacent pixels.

The image processing unit 320 includes an image generating section 321 and an image correction operation processing section (second image correction operation processing section) 340. The image generating section 321 includes a decoder 322 and a display image generating portion 323.

The decoder 322 decodes encoded image data (image data for which image processing including correction processing is performed) transmitted from the PC 200.

The display image generating portion 323 generates image data to be projected next by mixing image data corresponding to a frame, which corresponds to an image that is currently projected, with differential data decoded by the decoder 322.

The image correction operation processing section 340 has a function of setting correction processing, which is to be executed in the projector 300, on the basis of the correction processing indication information notified from the PC 200. Furthermore, the image correction operation processing section 340 performs correction processing for the image data generated in the display image generating portion 323. In addition, the correction processing performed by the image correction operation processing section 340 is correction processing other than the correction processing executed by the PC 200.

The driving control unit 350 outputs a control signal to drive the image projection unit 360.

As shown in FIG. 4, the image projection unit 360 is configured to approximately include a light source 361, two sheets of lens array 364, a color separation optical system 365, an electrooptical modulator 371, a cross dichroic prism 375, and a projection optical system 376.

In the configuration described above, light emitted from the light source 362 becomes parallel light beams by a reflector 363, passes through the two sheets of lens array 364, and progresses toward the color separation optical system 365. The color separation optical system 365 has a dichroic mirror 366, which causes red (R) light to be reflected therefrom and green (G) and blue (B) light to be transmitted therethrough, and a dichroic mirror 367, which causes green light to be reflected therefrom and blue light to be transmitted therethrough, in order to separate light into red, green, and blue light beams.

In addition, a red light beam is reflected by a reflecting mirror 368, a green light beam is reflected by the dichroic mirror 367, and a blue light beam is guided to a relay optical system 369 having two sheets of reflecting mirror 369a and 369b. In addition, the red light beam is incident on a red liquid crystal panel (light modulation device) 372 of the electrooptical modulator 371, the green light beam is incident on a green liquid crystal panel (light modulation device) 373 of the electrooptical modulator 371, and the blue light beam is incident on a blue liquid crystal panel (light modulation device) 374 of the electrooptical modulator 371. Then, predetermined modulation is performed on each of the red, green, and blue light beams in correspondence with image data in each of the liquid crystal panels 372 to 374 and then the light beams are mixed by a cross dichroic prism 375. An image obtained by the mixing is emitted from the projection optical system 376 to be projected on the screen 400 in an enlarged manner.

In addition, the image projection unit 360 shown in FIG. 4 is only an example. Accordingly, the invention is not limited to the configuration shown in FIG. 4.

Various kinds of correction processing using the correction parameters (parameters for resolution conversion, edge enhancement, black and white expansion, shape correction, color conversion, gamma correction, VT-gamma correction, ghost correction, crosstalk correction, color unevenness correction, and the like) stored in the image correction parameter storage unit 310 are performed in a predetermined order and time-series manner.

In the embodiment of the invention, the correction processing described above is divided into correction processing performed in a first half and correction processing performed in a second half on the basis of the order of correction processing. In this case, it is assumed that the correction processing performed in the first half is a first correction processing group and the correction processing performed in the second half is a second correction processing group.

That is, assuming that the various kinds of correction processing are performed, for example, in the order of resolution conversion, edge enhancement, black and white expansion, shape correction, color conversion, gamma correction, VT-gamma correction, ghost correction, crosstalk correction, and color unevenness correction, it is assumed that the first correction processing group performed in the first half includes the resolution conversion, the edge enhancement, the black and white expansion, the shape correction, the color conversion, the gamma correction, and the VT-gamma correction and the second correction processing group performed in the second half includes the ghost correction, the crosstalk correction, and the color unevenness correction in the embodiment of the invention.

The various kinds of correction processing belonging to the first correction processing group and the color unevenness correction belonging to the second correction processing group are correction processing performed mainly in the unit of a pixel, and the correction processing (excluding the color unevenness correction) belonging to the second correction processing group is correction processing that needs to be performed on a plurality of pixels that are adjacent to each other. Moreover, the color unevenness correction is performed as a final-stage correction processing. Accordingly, in order to perform efficient and suitable correction processing, it is preferable to perform the color unevenness correction after the ghost correction or the crosstalk correction.

In the correction processing performed in the pixel unit, predetermined conversion is performed on data of each pixel. Accordingly, in the case of compressing and transmitting image data after correction processing, the compression rate does not change a lot in both a case of compressing the image data at a stage of an image before the correction processing and a case of compressing the image data at a stage of an image after the correction processing. As a result, even in a case when image data, for which correction processing has been performed in an information processing apparatus, is transmitted to an image display apparatus through a signal transmission unit, such as a USB cable, having significant limitation in the transmission rate, it is possible to display an image with a proper frame rate in the image display apparatus.

On the other hand, in the case of correction processing (for example, ghost correction, crosstalk correction, and the like) that needs to be performed over a plurality of pixels adjacent to each other, image data after correction processing is affected by other image data over a wide range of region. Accordingly, as compared with a case of compressing original image data, it is difficult to increase the compression rate.

For this reason, in the case of an image, such as a still image, for which a transmission rate does not matter, it is possible to perform the correction processing that needs to be performed over the plurality of adjacent pixels in the PC. As a result, more precise correction can be performed. In contrast, in the case of an image, such as a motion picture, for which the transmission rate is important, it is preferable that the correction processing performed over the plurality of adjacent, pixels be executed in the projector.

Hereinafter, an operation of the image display system according to the embodiment of the invention, which has the configuration described above, will be described with reference to the flow chart shown in FIG. 5.

First, the PC 200 and the projector 300 are connected to each other using the USB cable 500 (step S1). The PC 200 acquires contents evaluation software from the projector 300 (step S2).

Then, the PC 200 acquires various kinds of correction parameters corresponding to projector specifications or characteristics stored in the projector 300 (step S3). The various kinds of correction parameters that are acquired are stored in the image correction parameter storage unit 210. Correction parameters stored in the image correction parameter storage unit 210 include: various kinds of correction parameters required when performing correction processing belonging to the first correction processing group, such as the resolution conversion, the edge enhancement, the black and white expansion, and the shape correction, the color conversion, the gamma correction, the VT-gamma correction; and various kinds of correction parameters required when performing processing belonging to the second correction processing group, such as the ghost correction, the crosstalk correction, and the color unevenness correction.

In addition, in the PC 200, the CPU 201 controls a DVD or the like and loads image data into the main memory 202 (step S4). Subsequently, the performance (for example, hardware configuration, throughput, and the like) of the PC 200 is checked (step S5). In addition, the performance of the PC 200 may be determined on the basis of the performance of a CPU, the capacity of a memory, a version of a driver, and the like.

The image generating section 230 of the PC 200 performs image processing, such as decoding or IP conversion (interlace/progressive conversion), according to a data format of image data to thereby generate one-frame image data (step S6) and then stores the one-frame image data in the main memory 202. Then, the image correction operation processing section 240 performs correction processing for the one-frame image data generated by the image generating section 230 (step S7).

Next, it will be described about correction processing for the one-frame image data stored in the main memory 202. When performing the correction processing, the image correction operation processing section 240 sets which correction processing is to be performed on the basis of a result of determination on the characteristics of the image data made by the image data characteristic determining section 280.

At this time, the image data characteristic determining section 280 performs at least one of determination on whether or not the image data is first characteristic image data (image data having a characteristic in which the display quality in the projector 300 weighs), determination on whether or not the image data is second characteristic image data (image data having a characteristic in which a rate of transmission to the projector 300 weighs), and determination on whether or not the image data is third characteristic image data (image data having a characteristic of temporal change between frames equal to or larger than a predetermined value).

In this case, as for image data to be determined as the first characteristic image data, it is preferable to add characteristic indication data, which indicates that the image data is the first characteristic image data, in the image data as metadata, for example. Thus, the image data characteristic determining section 280 can easily and appropriately determine that the image data is the first characteristic image data on the basis of the metadata added in the image data.

Further, the determination on whether or not the image data is the second characteristic image data may be performed on the basis of at least one of the compression rate of the image data, the resolution of the image data, the transmission rate of the image data, and characteristic indication data indicating that the image data is the second characteristic image data.

For example, since the amount of data increases as the compression rate decreases, it is necessary to transmit the image data at a higher transmission rate. In addition, since the amount of data also increases even in the case when the resolution is high, it is also necessary to transmit the image data at a higher transmission rate. Moreover, even in the case when the image data is image data that needs to be transmitted at a higher transmission rate, it is necessary to transmit the image data at the higher transmission rate.

Thus, the image data characteristic determining section 280 can determine whether or not the image data is the second characteristic image data on the basis of at least one of the compression rate of the image data, the resolution of the image data, and the transmission rate of the image data. Furthermore, even in the case when characteristic indication data indicating that image data to be displayed is the second characteristic image data is added as metadata in the image data, the image data characteristic determining section 280 can easily and appropriately determine that the image data is an image having the second characteristic image data on the basis of the metadata.

Furthermore, the determination on whether or not the image data is the third characteristic image data may be performed on the basis of at least one of the size of a movement vector between frames in the image data and characteristic indication data indicating that the image data is the third characteristic image data.

In addition, the size of the movement vector between frames in the image data may be determined by calculating the size of a movement vector of the image data in the unit of a block between frames of the image data and then using an integrated value or average value of movement vectors in the block unit, for example. Moreover, even in the case when characteristic indication data indicating that image data to be displayed is the third characteristic image data is added as metadata in the image data, the image data characteristic determining section 280 can easily and appropriately determine that the image data is the third characteristic image data on the basis of the metadata.

By allowing the image data characteristic determining section 280 to perform the determination processing described above, it is possible to determine the characteristics of image data.

In the case when the image data characteristic determining section 280 determines that image data is the second characteristic image data, the image data is considered to be image data corresponding to a motion picture. However, even if the image data is a motion picture, for example, in the case of an image in which there is little motion on the whole (for example, an image obtained by shooting the scenery, in which there is little motion on the whole, while moving a camera in the horizontal direction in order to acquire a panoramic effect) or an image in which there is a motion in part (for example, an image in which a flow of water exists in a part of the scenery in which there is little motion on the whole), it may be preferable to perform the same correction processing as for the first characteristic image data (image data having a characteristic in which the display quality in the projector 300 weighs).

Furthermore, even in the case when the image data characteristic determining section 280 determines that image data is the third characteristic image data, the image data is considered to be image data corresponding to a motion picture. However, even in this case, for the image in which there is a little motion on the whole or the image in which there is a motion in part, it may be preferable to perform the same correction processing as for the first characteristic image data.

Thus, by setting a proper threshold value for a compression rate and a value of temporal change, even a motion picture can be determined as the first characteristic image data. Accordingly, the same correction processing as for the first characteristic image data can be performed.

In addition, the image data characteristic determining section 280 is allowed to dynamically determine the characteristics of image data. In addition, the image correction operation processing section 240 is allowed to dynamically set correction processing, which is to be performed by the information processing apparatus 200, on the basis of a result of determination made by the image data characteristic determining section 280.

For example, in the case when a plurality of image data to be displayed exists, it is determined whether or not each of the plurality of image data has any of the characteristics of the first characteristic image data, second characteristic image data, and third characteristic image data and correction processing, which is to be performed by the information processing apparatus 200, is dynamically set on the basis of a result of the determination.

Moreover, even in the case of predetermined single image data, such as a movie, as well as each of the plurality of image data, it may be determined whether or not each scene of the image data has any of the characteristics of the first characteristic image data, second characteristic image data, and third characteristic image data and correction processing, which is to be performed by the information processing apparatus 200, may be set on the basis of a result of the determination.

In addition, a case in which the image data characteristic determining section 280 determines that image data is the second characteristic image data and a case in which the image data characteristic determining section 280 determines that image data is the first characteristic image data will be described below. In addition, it is assumed that the second characteristic image data is a motion picture and the first characteristic image data is a still image.

Case in Which Image Data is Second Characteristic Image Data

If it is determined that image data is the second characteristic image data, the image correction operation processing section 240 first decides a correction parameter required for correction processing to be performed by the PC 200. In addition, the correction processing to be performed by the PC 200 is set on the basis of a result of determination on the image data characteristics made by the image data characteristic determining section 280; however, correction processing executable in the PC 200 is limited to some extent according to the performance (for example, hardware configuration, throughput, and the like) of the PC 200. Here, it is assumed that the image correction operation processing section 240 determines on the basis of the characteristics of image data and the performance of the PC 200 that correction processing belonging to the first correction processing group can be performed in the PC 200. Thus, processing for checking what kind of correction processing can be executed in the PC 200 corresponds to processing in step S5 of FIG. 5.

Further, if the correction processing executable in the PC 200 is set, the image correction operation processing section 240 generates correction processing indication information indicating what kind of correction processing is to be executed in the PC 200. This correction processing indication information is notified to the projector 300 at predetermined timing. Even though the timing at which the correction processing indication information is notified to the projector 300 is not particularly limited, the correction processing indication information may be notified to the projector 300 at the time of transmitting to the projector 300 image data correction-processed by the image correction operation processing section 240. For example, by writing the correction processing indication information into a header of one-frame image data when generating transmission data using the encoder, it is possible to notify the correction processing indication information to the projector 300.

In this case, since correction processing belonging to the first correction processing group is executed in the PC 200, correction processing belonging to the second correction processing group is executed in the projector 300. Then, in the PC 200, the correction processing belonging to the first correction processing group is performed for one-frame image data generated in step S6 of FIG. 5 (step S7) and then the one-frame image data for which the correction processing has been performed is encoded (step S8). Then, the one-frame image data that is encoded is transmitted to the projector 300 through the USB cable 500 (step S9).

In addition, while encoding the one-frame image data, a difference between the one-frame image data and image data before one frame may be acquired and then the acquired differential data may be transmitted to the projector 300. In the embodiment of the invention, the differential data is transmitted from the PC 200 to the projector 300.

On the other hand, in the projector 300, the one-frame image data (differential data) transmitted from the PC 200 is decoded by the decoder 322 (step S10). Then, the decoded differential data is mixed with image data being currently displayed in the display image generating portion 323 and one-frame image data (referred to as 'next-frame image data) to be displayed next is generated (step S11).

Subsequently, the next-frame image data generated in step S11 is subjected to correction processing in the image correction operation processing section 340 (step S12). At this time, the image correction operation processing section 340 determines which kind of correction processing is performed in the PC 200, on the basis of the correction processing indication information written in the header of image data, and sets correction processing, which is to be executed in the image correction operation processing section 340, on the basis of a result of the determination. In this case, as the correction processing to be executed by the image correction operation processing section 340, the correction processing (crosstalk correction, ghost correction, color unevenness correction, and the like) belonging to the second correction processing group is performed. In addition, brightness unevenness correction and the like may be performed as needed.

After the next-frame image data is generated as described above, a control signal for displaying the generated next-frame image data is output from the driving control unit 350 to the image projection unit 360. Thus, the driving control for displaying the next-frame image data is realized (step S13). Then, an image is projected from the image projection unit 360 onto the screen 400, such that the image is displayed on the screen 400 (step S14).

In addition, the correction processing belonging to the first correction processing group and the correction processing belonging to the second correction processing group may be selectively executed as necessary. The same is true for 'case in which image data is the first characteristic image data', which will be described below.

Case in Which Image Data is First Characteristic Image Data

Even in the case when the image data characteristic determining section 280 determines that image data is the first characteristic image data, correction processing for one-frame image data stored in the main memory 202 is performed in the same manner as in the case when image data is the second characteristic image data.

In the case when image data is the first characteristic image data, both the correction processing belonging to the first correction processing group and the correction processing belonging to the second correction processing group are performed in the PC 200. In addition, even though correction processing to be performed in the PC 200 is set on the basis of a result of determination on the image data characteristics made by the image data characteristic determining section 280 in the same manner as in the 'case in which image data is the second characteristic image data', correction processing executable in the PC 200 is limited to some extent according to the performance (for example, hardware configuration, throughput, and the like) of the PC 200. Here, it is assumed that the image correction operation processing section 240 determines on the basis of the characteristics of image data and the performance of the PC 200 that the correction processing belonging to the first correction processing group and the correction processing belonging to the second correction processing group can be performed in the PC 200.

Further, if the correction processing executable in the PC 200 is set, the image correction operation processing section 240 generates correction processing indication information indicating what kind of correction processing is to be executed in the PC 200. For example, in the same manner as the case of the motion picture, it is possible to notify the correction processing indication information to the projector 300 by writing the correction processing indication information into a header of one-frame image data when generating transmission data using the encoder 250.

In the case when image data is the first characteristic image data, both the correction processing belonging to the first correction processing group and the correction processing belonging to the second correction processing group are performed in the PC 200. That is, the PC 200 performs correction processing belonging to the second correction processing group, such as the crosstalk correction, the ghost correction, and the color unevenness correction, as well as correction processing belonging to the first correction processing group, such as the resolution conversion, the edge enhancement, the black and white expansion, the shape correction, the color conversion, the gamma correction, and the VT-gamma correction (step S7). As described above, in the case when image data is the first characteristic image data, the crosstalk correction, the ghost correction, and the color unevenness correction are also performed in the PC 200. Accordingly, highly precise correction is possible.

Then, after performing the various kinds correction in the PC 200, one-frame image data for which the correction processing has been performed is encoded (step S8) and the encoded image data is transmitted to the projector 300 (step S9). Even in this case, it is assumed that differential data is transmitted. Moreover, in the case when it is not possible to increase the compression rate, the same image data is transmitted to the projector 300.

On the other hand, in the projector 300, processing shown in steps S10 to S14 of FIG. 5 is performed. That is, in the projector 300, the one-frame image data transmitted from the PC 200 is received, differential data is decoded by the decoder 322 if the differential data is transmitted, and the decoded differential data is mixed with image data being currently displayed to thereby generate next-frame image data in the display image generating portion 323.

Then, correction processing for the generated next-frame image data is performed by the image correction operation processing section 340. At this time, the image correction operation processing section 340 determines which kind of correction processing is performed in the PC 200, on the basis of the correction processing indication information written in the header of image data, and sets correction processing, which is to be executed in the image correction operation processing section 340, on the basis of a result of the determination. In this case, since the correction processing belonging to the first correction processing group and the correction processing belonging to the second correction processing group are performed in the PC 200, the image correction operation processing section 340 performs correction processing if there is any correction processing to be executed except for the correction processing belonging to the first correction processing group and the correction processing belonging to the second correction processing group, Then, the driving control for displaying the next-frame image data, for which the correction processing has been performed, is made. Then, an image is projected from the image projection unit 360 onto the screen 400, such that the image is displayed on the screen 400.

As described above, according to the embodiment of the invention, the image data characteristic determining section 280 performs at least one of determination on whether or not image data is the first characteristic image data (image data having a characteristic in which the display quality in the projector 300 weighs), determination on whether or not image data is the second characteristic image data (image data having a characteristic in which a rate of transmission to the projector 300 weighs), and determination on whether or not image data is the third characteristic image data (image data having a characteristic of temporal change between frames equal to or larger than a predetermined value. In addition, correction processing to be performed in the PC 200 and the correction processing to be performed in the projector 300 may be dynamically changed on the basis of a result of determination on the image data characteristics made by the image data characteristic determining section 280.

For example, in the case when image data is image data corresponding to a motion picture and the image data is determined to be the second characteristic image data, the correction processing belonging to the first correction processing group is performed in the PC 200 and the correction processing belonging to the second correction processing group is performed in the projector 300.

Furthermore, in the case when image data is image data corresponding to a still image and the image data is determined to be the first characteristic image data, both the correction processing belonging to the first correction processing group and the correction processing belonging to the second correction processing group are performed in the PC 200.

In this case, the correction processing belonging to the first correction processing group is mainly performed in the unit of a pixel of an image. Accordingly, in the correction processing in the PC 200, predetermined conversion is performed on data corresponding to each pixel. For this reason, the compression rate does not significantly change in both a case of compressing image data at a stage of an image before the correction processing and a case of compressing the image data at a stage of an image after the correction processing. As a result, even in a case when image data, for which correction processing has been performed in the PC 200, is transmitted to the projector 300 through a signal transmission unit, such as a USB cable, having significant limitation in the transmission rate, it is possible to display an image with a proper frame rate in the projector 300. Thus, even when the correction processing belonging to the first correction processing group is performed for image data whose compression rate is low, such as image data corresponding to a motion picture, it is possible to appropriately maintain the frame rate for image display in an image display apparatus. Accordingly, since an image can be displayed at the appropriate frame rate in the image display apparatus, high-quality image display becomes possible.

Furthermore, since processing, such as the resolution conversion, the edge enhancement, the black and white expansion, the shape correction, the color conversion, the gamma correction, and the VT-gamma correction, is performed in the PC 200, an operation using a graphic operation function, such as a GPU, of the PC 200 is possible. Accordingly, even in the case of a motion picture, it is possible to perform highly precise correction processing in a real-time manner. In contrast, in the case when correction, such as color conversion, is performed by an image processing unit in the projector 300, most of the portion within a three-dimensional RGB color space is color-converted by linear approximation due to limitation in the circuit configuration, and accordingly, it has been difficult to perform highly precise color conversion processing; however, in the embodiment of the invention, it can be improved. The same is true for other correction processing as well as the color conversion.

On the other hand, in the case of an image, such as a still image, in which the display quality weighs, both the correction processing belonging to the first correction processing group and the correction processing belonging to the second correction processing group are performed in the PC 200. Thus, in the case of an image, such as a still image, in which high display quality is requested rather than the processing speed or the transmission rate, the PC 200 performs not only the correction processing belonging to the first correction processing group but also the correction processing belonging to the second correction processing group. As a result, since highly precise correction processing can be performed, the quality of a display image displayed by the projector 300 can be further improved.

As described above, in the image display system according to the embodiment of the invention, correction processing to be performed in the PC 200 and correction processing to be performed in the projector 300 are dynamically changed according to the characteristics of image data. As a result, it is possible to perform correction processing according to the characteristics of image data, such as a motion picture or a still image, to appropriately maintain the frame rate for image display in the projector, and to realize high-quality image display.

In addition, even if image data is a motion picture, for example, in the case of an image in which there is little motion on the whole (for example, an image obtained by shooting the scenery, in which there is little motion on the whole, while moving a camera left and right in order to acquire a panoramic effect), an image in which there is a motion in part (for example, an image in which a flow of water exists in a part of the scenery in which there is little motion on the whole), or an image having a low spatial frequency and no temporal change (for example, the sky or a snow field that spreads on a surface), it is preferable to perform the same correction processing as for the still image or correction processing based on the correction processing for the still image, that is, it is preferable that the PC 200 perform more correction processing. Moreover, in the case when a high-quality image is not particularly requested like an image for presentation even if the image data is a still image, the projector 300 may perform more correction processing.

Further, in the image display system according to the embodiment of the invention, the correction processing to be performed in the PC 200 and the correction processing to be performed in the projector 300 can be dynamically changed according to the characteristics of image data.

Accordingly, for example, even in the case when the projector 300 has a configuration in which all correction processing (correction processing belonging to the first correction processing group and correction processing belonging to the second correction processing group) can be performed in the projector 300, it is possible to suppress the performance of the projector 300 to the extent that each of the correction processing can be performed with limited precision. As a result, the projector 300 used in the image display system according to the embodiment of the invention can be manufactured with lower cost than a normal projector.

Furthermore, in the image display system according to the embodiment of the invention, even if such projector is used, highly precise correction processing may be performed by using a high-performance PC in the case of displaying an image for which highly precise correction processing is needed. In addition, in the case of an image for which high-quality display is not needed, it may be possible to use a PC, a portable information processing terminal, and the like that are not expensive and has a low performance. In addition, as an extreme example, all kinds of correction processing may be performed in the projector.

In addition, it should be understood that the invention is not limited to the above-described embodiment but various modifications can be made within the scope without departing from the scope and spirit of the invention.

For example, in the embodiment described above, in the case of various kinds of correction parameters (correction parameters required to perform correction processing belonging to the first correction processing group and correction parameters required to perform correction processing belonging to the second correction processing group) required for correction processing in the PC 200, the PC 200 acquires the various kinds of correction parameters from the projector 300 when the PC 200 and the projector 300 are connected to each other and then stores the various kinds of correction parameters in the image correction parameter storage unit 210. However, the PC 200 may acquire the various kinds of correction parameters from a memory card, a CD-ROM, and the like, which store the various kinds of correction parameters, and then store the various kinds of correction parameters in the image correction parameter storage unit 210.

In addition, a user may add a new correction parameter or change the various kinds of correction parameters, for example, through a keyboard of the PC 200.

Further, in the embodiment described above, group division is performed such that the first correction processing group includes the resolution conversion, the edge enhancement, the black and white expansion, the shape correction, the color conversion, the gamma correction, and the VT-gamma correction, which are performed in the first half and the second correction processing group includes the ghost correction, the crosstalk correction, and the color unevenness correction, which are performed in the second half. However, the invention is not limited thereto. For example, either the ghost correction or the crosstalk correction may be included in the first correction processing group according to the amount of data or compression rate of image data.

Furthermore, in the embodiment described above, a correction processing mode (referred to as 'correction processing mode A') for performing the correction processing belonging to the first correction processing group and a correction processing mode (referred to as 'correction processing mode B') for performing both the correction processing belonging to the first correction processing group and the correction processing belonging to the second correction processing group are exemplified as a correction processing mode for performing correction processing corresponding to the characteristics of image data. However, a function of displaying whether a current correction processing mode is the correction processing mode A or the correction processing mode B for a user may be provided in the PC 200. As a display method, for example, an indicator for correction processing mode display is displayed on a screen of the PC 200 and it is displayed whether a current correction processing mode is the correction processing mode A or the correction processing mode B on the basis of the indicator for correction processing mode display. Such display of a correction processing mode may be performed in the projector 300.

Furthermore, in the embodiment described above, the projector is exemplified as an image display apparatus. However, the image display apparatus is not limited to the projector. For example, the image display apparatus may be a direct view type image display apparatus that displays an image on a CRT, a liquid crystal display, or the like.

Furthermore, in the embodiment described above, a case of using the differential data has been explained as a method of compressing image data. However, other compression methods may be used.

In addition, in the embodiment described above, the PC is exemplified as an information processing apparatus. However, the information processing apparatus is not limited to the PC. For example, the information processing apparatus may be various kinds of game devices, a DVD player, a photo viewer, and the like.

In addition, an image correction program used in an information processing apparatus, which is used to cause the image correction operation processing section 240 of the PC 200 to execute the correction processing in the PC 200 described in the above embodiment, may be recorded in various kinds of recording mediums. Similarly, an image correction program used in an image display apparatus, which is used to cause the image correction operation processing section 340 of the projector 300 to execute the correction processing in the projector 300, may be recorded in various kinds of recording mediums.

Therefore, the invention also includes a recording medium in which an image correction program for the information processing apparatus is recorded and a recording medium in which an image correction program for the image display apparatus is recorded. In addition, the various kinds of image correction programs may be acquired through a network.

The entire disclosure of Japanese Patent Application Nos. 2006-186376, filed Jul. 6, 2006 and 2007-131314, filed May 17, 2007 are expressly incorporated by reference herein.

What is claimed is:

1. An image display system comprising:
   an information processing apparatus that performs predetermined correction processing for image data to be displayed; and
   an image display apparatus that displays an image on the basis of the image data correction-processed in the information processing apparatus, wherein:
   the information processing apparatus includes a first image correction operation processing section that executes, for the image data, correction processing set on the basis of characteristics of the image data of a plurality of correction processing to be performed for the image data,
   the image display apparatus includes a second image correction operation processing section that executes, for the image data correction-processed in the information processing apparatus, correction processing other than correction processing executed in the information processing apparatus of the plurality of correction processing to be performed for the image data,
   the information processing apparatus includes an image data characteristic determining section that determines characteristics of the image data, and
   the first image correction operation processing section sets correction processing, which is to be executed in the information processing apparatus, of the plurality of correction processing to be performed for the image data on the basis of the characteristics of the image data determined by the image data characteristic determining section.

2. The image display system according to claim 1,
   wherein the information processing apparatus and the image display apparatus are connected to each other through a signal transmission unit.

3. The image display system according to claim 1,
wherein the image data characteristic determining section dynamically determines the characteristics of the image data according to the image data, and
the first image correction operation processing section dynamically sets correction processing, which is to be performed by the information processing apparatus, on the basis of a result of the determination made by the image data characteristic determining section.

4. The image display system according to claim 1,
wherein the image data characteristic determining section performs at least one of determination on whether or not the image data is first characteristic image data having a characteristic in which display quality in the image display apparatus weighs, determination on whether or not the image data is second characteristic image data having a characteristic in which a rate of transmission to the image display apparatus weighs, and determination on whether or not the image data is third characteristic image data having a characteristic of temporal change between frames equal to or larger than a predetermined value.

5. The image display system according to claim 4,
wherein assuming that the plurality of correction processing to be performed for the image data is divided into a first correction processing group, which is a group of correction processing performed in a first half in an order of correction processing, and a second correction processing group, which is a group of correction processing performed in a second half in the order of correction processing, the first image correction operation processing section executes correction processing belonging to the first correction processing group and correction processing belonging to the second correction processing group in a case when the image data is determined to be the first characteristic image data and executes the correction processing belonging to the first correction processing group in at least one of cases when the image data is determined to be the second characteristic image data and the image data is determined to be the third characteristic image data.

6. The image display system according to claim 4,
wherein the determination on whether or not the image data is the first characteristic image data is performed on the basis of characteristic indication data indicating that the image data is the first characteristic image data.

7. The image display system according to claim 4,
wherein the determination on whether or not the image data is the second characteristic image data is performed on the basis of at least one of a compression rate of the image data, resolution of the image data, a transmission rate of the image data, and characteristic indication data indicating that the image data is the second characteristic image data.

8. The image display system according to claim 4,
wherein the determination on whether or not the image data is the third characteristic image data is performed on the basis of at least one of the size of a movement vector between frames in the image data and characteristic indication data indicating that the image data is the third characteristic image data.

9. The image display system according to claim 1,
wherein the information processing apparatus has a function of notifying the image display apparatus of information that indicates correction processing, which is to be performed in the information processing apparatus, of the plurality of correction processing to be performed for the image data.

10. The image display system according to claim 1,
wherein the information processing apparatus includes a transmission data generating section that generates transmission data to be transmitted to the image display apparatus by compressing the image data correction-processed by the first image correction operation processing section.

11. The image display system according to claim 1,
wherein the information processing apparatus includes a correction parameter storage section that stores correction parameters required for correction processing executed in the first image correction operation processing section.

12. An image display apparatus that displays an image on the basis of image data correction-processed by an information processing apparatus that executes correction processing corresponding to characteristics of image data to be displayed, comprising:
an image correction operation processing section that executes, for the image data that is correction-processed, correction processing other than correction processing executed in the information processing apparatus of the plurality of correction processing to be performed for the image data, wherein:
the information processing apparatus includes an image data characteristic determining section that determines characteristics of the image data, and
the image correction operation processing section sets correction processing, which is to be executed in the information processing apparatus, of the plurality of correction processing to be performed for the image data on the basis of the characteristics of the image data determined by the image data characteristic determining section.

13. The image display apparatus according to claim 12,
wherein the image correction operation processing section has a function of setting the correction processing other than the correction processing executed in the information processing apparatus from a plurality of correction processing, which is notified from the information processing apparatus and is to be performed for the image data, on the basis of information that indicates the correction processing executed in the information processing apparatus.

* * * * *